June 17, 1952　　　A. B. FOX　　　2,600,748
FLASH HOLDER BRACKET ATTACHMENT FOR CAMERAS
WITH RESILIENTLY HELD LATCHES
Filed April 8, 1950
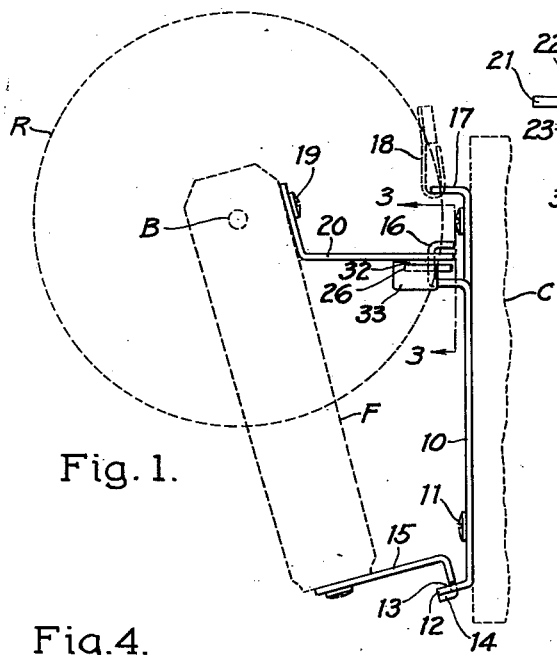
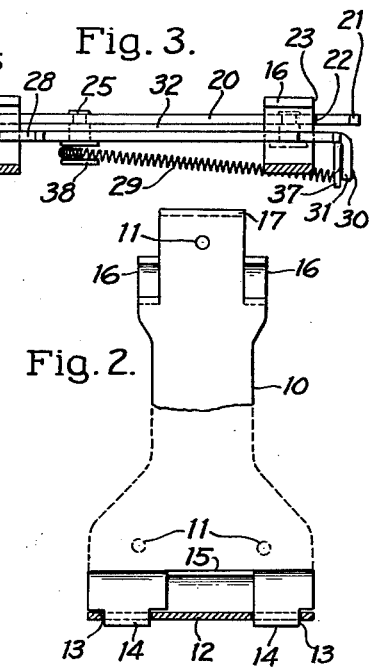
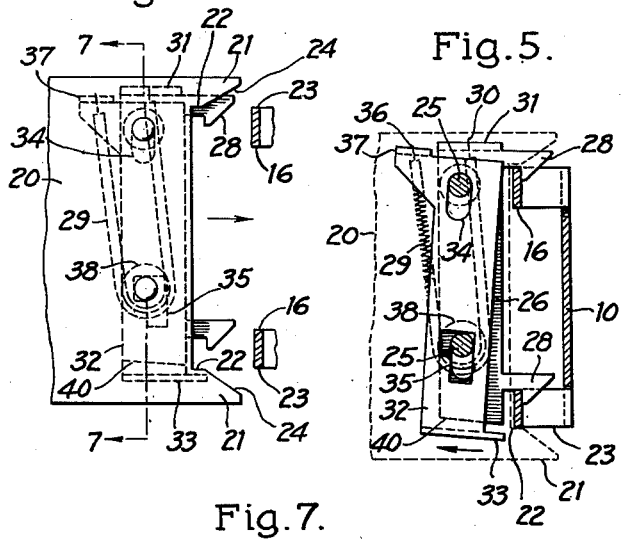
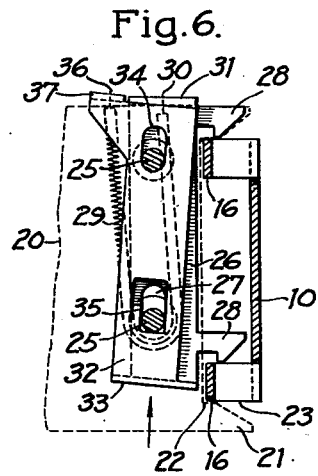
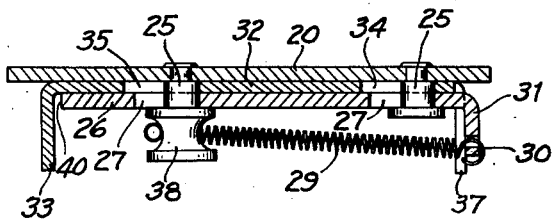
Arthur B. Fox
Inventor
By Daniel J. Mayne
Attorneys Patented June 17, 1952

2,600,748

UNITED STATES PATENT OFFICE 2,600,748

FLASH HOLDER BRACKET ATTACHMENT FOR CAMERAS WITH RESILIENTLY HELD LATCHES

Arthur B. Fox, Rochester, N. Y., assignor to Eastman Kodak Company, Rochester, N. Y., a corporation of New Jersey Application April 8, 1950, Serial No. 154,838

8 Claims. (Cl. 240—52)

The present invention relates to flash photography and particularly to an attaching bracket by the use of which a flash holder can be readily detachably connected to the wall of a camera.

Brackets for attaching flash holders to cameras have been commercially available for many years. However, those brackets which are and have been available for this purpose have been intended primarily for attaching the flash holder to the camera so that it can be handled as a unit therewith and will direct the light in the proper direction for illuminating the subject. In the majority of cases they have included a bracket with an end which is permanently attached to the camera by a screw engaging the tripod adapter socket in the camera body; the flash holder, in turn, being connected to the other end of the bracket by a clamp ring, or similar structure. Such brackets are not adaptable for quick attachment and detachment relative to the camera, do not hold the flash holder rigidly to the camera, and do not accurately position the flash holder so that the beam is properly directed on the field of the camera without adjustment after the flash holder is attached to the camera.

One object of the present invention is to provide a bracket for attaching a flash holder to the wall of a camera which permits the flash holder to be quickly snapped into place on the camera with no turning of clamping screws being necessary.

Another object is to provide a bracket of the type set forth which, while allowing ready removal of the flash holder from the camera, prevents it from being accidentally released therefrom.

A further object is to provide a bracket of the type described which rigidly holds the flash holder on the wall of the camera in position to properly direct the beam of the flash onto the subject being photographed, the position of the flash holder being duplicated each time the same is placed on the camera without requiring supplemental adjustment thereof.

And, still another object is to provide a bracket of the type set forth which holds the flash holder on the camera with sufficient rigidity to permit it to be used as a handle for carrying and holding the camera in picture-taking position. This leaves one hand of the photographer free for making the necessary focus, diaphragm and other adjustments, and is a particularly desirable feature in connection with press or view-type cameras.

The novel features that I consider characteristic of my invention are set forth with particularity in the appended claims. The invention itself, however, both as to its organization and its methods of operation, together with additional objects and advantages thereof, will best be understood from the following description when read in connection with the accompanying drawing, in which:

Fig. 1 is a rear elevational view showing a flash holder attached to the wall of a camera by a bracket constructed in accordance with a preferred embodiment of the present invention. The flash holder and camera have been shown in dotted lines so as to clearly differentiate the parts making up the bracket from the camera and flash holder; it being pointed out that this bracket is not limited to use with any particular form of flash holder, or camera;

Fig. 2 is a partially sectional and elevational view of the base plate forming a part of the bracket looking from the side thereof which normally engages the camera and showing the manner in which prongs on a lower bracket member engage transverse slots therein to hold the lower end of the flash holder onto the camera;

Fig. 3 is an enlarged sectional view taken substantially on line 3—3 of Fig. 1 and showing the relative position of the parts when the flash holder is latched on the camera;

Fig. 4 is an enlarged plan view of the latch portion of the bracket and showing the relative position of the parts as the flash holder is being moved to a latched position on the camera;

Fig. 5 is a view similar to Fig. 4 but showing how the release member of the latch must first be moved in a transverse direction before it can be moved longitudinally to release the latch;

Fig. 6 is a view similar to Figs. 4 and 5 but showing the latch moved to a released position; and Fig. 7 is an enlarged sectional view taken substantially on line 7—7 of Fig. 4.

Like reference characters refer to corresponding parts throughout the drawing.

Referring now to the drawings, my flash holder bracket comprises a base plate 10, of the form best shown in Fig. 2, which is fastened to the vertical side wall of a camera C by a plurality of screws 11. The lower end 12 of the base plate 10 is turned outwardly from the camera wall and is provided with a pair of narrow slots 13 spaced from one another transversely of the plate. A pair of prongs 14, turned down from the end of a lower bracket 15 fastened to the bottom of the flash holder F, are adapted to slip into the slots 13 and positively hold the lower end of the flash holder to the camera wall, as clearly shown in Figs. 1 and 2. Preferably, the prongs 14 should be wide enough to completely fill the slots 13 so as to eliminate sidewise play between the lower bracket and the base plate. It will be appreciated that the flash holder F comprises an elongated case adapted to contain flashlight batteries and having a reflector R fixed to the front near the top in encircling relation to a lamp socket, not shown. The flash holder may also include a pushbutton B on the rear wall adjacent the top thereof which is depressed with the thumb to instigate a flash exposure.

Adjacent the upper end of the base plate a pair of similar U-shaped lugs 16 are formed out of opposite edges of the base plate. As clearly shown in Fig. 1, the vertical portion of each lug 16 is spaced away from the camera wall, or the base plate proper, and constitute parts of a latch mechanism for holding the flash holder on the camera wall, as will be hereinafter fully described. The extreme upper end of the base plate may terminate in a turned-over end 17 which is slotted to receive one end of a carrying strap 18 with which a camera of the press type is usually provided.

Fixed to the upper end of the flash holder F by screws 19 is an upper bracket 20 disposed vertically above the lower bracket and adapted to carry at its end a latching mechanism for releasably locking the flash holder on the camera. As best shown in Figs. 4–6, the free end of the upper bracket is provided with a pair of spaced ears 21, spaced apart by such a distance that when the end of the bracket is moved toward the camera, the straight edges 22 of the ears embrace the outside edges 23 of the vertical portions of the lugs 16 on the base plate and thus insure the upper end of the flash holder having no sidewise play on the camera wall. The inner corner of each ear 21 is tapered inwardly, as shown at 24, so as to engage the outside edges of the lugs and properly guide the end of the upper bracket into final position as the flash holder is swung toward the camera about the fulcrum provided by the prongs 14 and the slotted end 12 of the base plate engaged thereby. This construction also insures the latch elements on the upper bracket being properly aligned with the lugs 16 which they engage when the flash holder is swung to a latched position, as will be fully described hereinafter.

Fixed to the upper bracket 20, and extending from the one side thereof, are a pair of headed studs 25. Slidably mounted on these studs is a latch plate 26 provided with two elongated slots 27 engaging the studs. Extending from the side of said latch plate are a pair of similar hook-shaped latch members 28 which are adapted to positively engage the vertical portions of opposite ones of lugs 16 and positively lock the upper end of the flash holder to the base plate 10 and camera C, as shown in Figs. 3 and 4. The latch plate and latch members are normally moved to a latching position on studs 25 by a tension spring 29, one end 30 of which engages a hole in a turned-down end 31 of the latch plate, see Fig. 7. The forward ends of the hook-shaped latch members are tapered, as shown, so that when the upper end of the flash holder is swung toward the camera to a latching position, they will engage the corners of lugs 16 and be cammed out of the way and subsequently snap back into positive engagement, or overhanging relation, with lugs 16. An inspection of Figs. 4–6 will show how the tapered portion 24 of each ear 21 on the bracket serves to properly align the latch members 28 with the lugs 16 which they engage as the flash holder is swung to its final position. When the flash holder is in latched position, the straight faces of the latch members engage one face of the vertical portion of lugs 16, the end of the upper bracket engages the opposite face of the lugs, while the outside edges of the lugs are embraced by the straight portions 22 of ears 21. It will thus be seen that there is no possibility of relative movement between the upper bracket and base plate in any direction, and, for this reason, the flash holder is held onto the camera rigidly enough to serve as a carrying handle therefor without danger of its desired alignment with the camera lens becoming upset. Also, the latch and bracket construction is sufficiently heavy and rigid enough to permit the heaviest press or view-type camera to be carried by the flash holder as a handle. The upper and lower brackets are of different length so as to mount the flash holder at a sufficient angle to the camera wall that the reflector of the flash holder will be removed from the field of the camera lens and/or camera view finder.

For selectively moving the latch plate 26 and latch members 28 thereon to a release position against the action of spring 29, a release member 32 is slidably mounted on the studs 25 between the underside of the upper bracket 20 and the latch plate 26, see Fig. 7. This release member is provided with a turned-down end 33 at the rear of the bracket which serves as a thumbpiece by means of which the release member can be pressed forwardly by the thumb while holding the flash holder in the left hand and the camera in the right hand to release the latch. The elongated slot 34 in the forward end of the release member is straight and aligned with that in the latch plate, whereas the elongated slot 35 at the rear of the release member is offset from a line joining the studs and terminates in a transverse portion into which the stud moves when the release member is in its normal position. The release member is normally returned to the position shown in Figs. 1 and 4, due to a combined longitudinal and cocking motion, by spring 29 having its end 36 fixed to an arm 37 on the release member disposed eccentrically to the foremost stud 25. By passing the intermediate portion of a common coil spring 29 around a fluted portion 38 of the rearmost stud 25, see Fig. 7, and having the opposite ends thereof connected to the latch plate 26 and the release member 32, as shown and described, a single spring is made to do the job of two separate springs.

The reach of the spring 29 connected to the release member not only serves to retract the release member to its rearmost position, but also serves to pivot the release member about the foremost stud when the transverse portion of slot 35 comes opposite the stud engaged thereby. At this time the stud moves into the transverse portion of stud 35 and the right-hand end of the thumb portion 33 on the release member, looking at Fig. 1, moves behind one of lugs 16, see Figs. 1 and 4. It is thus impossible to push the release member longitudinally forward to release the latch and, by virtue of this construction, the latch is prevented from accidental release which might be occasioned by any number of different circumstances; for example, by the photographer accidentally pushing the release member instead of pushbutton B in attempting to take a picture.

As clearly shown in Fig. 5, in order to release the latch, the release member 32 must first be swung about the front stud as a pivot by pressing sideways on the thumb portion 33 and in a direction as indicated by the arrow in Fig. 5. When this is done, the transverse portion of slot 35 is moved away from the rearmost stud and the end of thumb piece 33 is moved to one side of the lug 16. Now the release member 32 can be pushed longitudinally forward as indicated by the arrow in Fig. 6 and, in so moving, the front edge of the thumb portion 33 engages the end 40 of latch plate 26 and moves it forward to a latch-releasing position, as shown in Fig. 6. As shown in Fig. 4, the end of the latch plate 26 which is to be engaged by the thumb portion 33 of the release member 32 is inclined to account for the cocked position of the release member relative to the latch member when in a position to be moved forwardly to a latch-releasing position. After the latch is released, it is only necessary to swing the top portion of the flash holder away from the camera about the lower end until the prongs 14 are tipped enough so that they can be lifted out of the slots 13 in the end 12 of the base plate. In order to attach the flash holder to the camera, the prongs 14 on the end of the lower bracket are first engaged in the slotted end 12 at the bottom of the base plate. The flash holder is then rotated upwardly, pivoting about the slotted end 12, until the latch members 28 on the upper bracket snap into engagement with the lugs 16 on the base plate.

Although I have shown and described certain embodiments of my invention, I am aware that many modifications thereof are possible. My invention, therefore, is not to be restricted to the precise details of construction of the embodiments shown and described, but is intended to cover all modifications coming within the scope of the appended claims.

Having thus described my invention, what I claim is new and desire to secure by Letters Patent of the United States is:

1. A bracket for attaching a flash holder to the side wall of a camera comprising in combination a base plate permanently attached to the wall of the camera, the lower end of said base plate extending away from the camera wall and provided with a transverse slot; a pair of lugs on the upper end of said base plate spaced away from said plate proper and spaced from each other transversely of said base plate; a lower bracket fixed at one end to the lower end of the flash holder, the other end thereof provided with a prong adapted to extend through and pivotally engage said slot in the lower end of the base plate; an upper bracket fixed at one end to the upper end of said flash holder, and extending from the same side of the flash holder as said lower bracket; a pair of latch members mounted on the free end of said upper bracket to move to and from a normal position, wherein they are adapted to positively engage said pair of lugs when the upper end of said flash holder is pivoted toward the camera wall about its lower end, means for selectively moving said latch members from their normal position to a release position and including a part which must be moved in two different directions in succession so as to prevent accidental detachment of the flash holder from the camera.

2. A flash holder bracket according to claim 1, in which the free end of said upper bracket terminates in a pair of ears transversely spaced thereon so that a straight portion on each, and which portions are parallel to each other, embrace the outer edges of said lugs of the base plate when the latch members are engaged with said lugs, whereby the upper bracket is positively held against transverse movement relative to the base plate.

3. A flash holder bracket according to claim 1, in which the free end of said upper bracket terminates in a pair of ears transversely spaced thereon so that the inner edge of each embraces the outer edge of opposite ones of said lugs on the base plate when the upper bracket is moved into contact with said base plate; a portion of the inner edge of each of the ears including the extreme outer end thereof being tapered outwardly from the plane including the outer edges of said lugs to guide the upper bracket into proper position relative to the lugs on the base plate for said latch members to engage said lugs.

4. A bracket for attaching a flash holder to the side wall of a camera comprising in combination a base plate permanently attached to the wall of the camera, the lower end of said base plate extending away from said camera wall and provided with a transverse slot; a pair of lugs on the upper end of said base plate in parallel spaced relation with said base plate and spaced from each other transversely of said base plate; a lower bracket fixed at one end to the bottom of said flash holder, the outer end thereof terminating in a turned-down prong adapted to extend through said slot and pivotally engage said lower end of the base plate; an upper bracket fixed at one end to the upper end of the flash holder and extending from the same side of the flash holder as said lower bracket, a latch plate slideably mounted on the free end of said upper bracket to move transversely of said base plate to and from a latching position, a pair of latch members extending from said latch plate and adapted to positively engage said lugs on the base plate when said latch plate is in its latching position to hold the flash holder on said camera wall; a spring normally moving said latch plate to its latching position; means for selectively moving said latch plate from its latching position and comprising a release member movably mounted on said upper bracket to move between an inoperative position, wherein it allows said latch plate to assume its normal latching position, and an operative position, wherein it moves said latching plate from its locking position; an operative connection between said release member and said latching plate adapted to be established during movement of said release member to its operative position, a spring normally moving said release member to its inoperative position; and means for preventing said release member from being moved to its operative position until it is first moved in a direction different from that it is to be moved to reach its operative position, whereby accidental release of said latching means is prevented.

5. An attaching bracket according to claim 4, characterized by the fact that the same spring serves to move said latch plate to its latch position and said release member to its inoperative position.

6. An attaching bracket according to claim 4, in which said release member is slideably mounted on said upper bracket by a pin and slot connection which positively prevents longitudinal movement of said member from its normal inoperative position to its operative position until one end thereof is first pivoted in a direction substantially transverse to said member; and in which said spring normally acting on said release member is arranged to move it longitudinally and pivot it about one end and thereby return it to its full inoperative position.

7. An attaching bracket according to claim 4, characterized by the fact that said latch plate is providing with two longitudinal slots engaging a pair of studs on said upper bracket to slide longitudinally in moving between its two positions, said release member provided with two longitudinal slots engaging said pair of studs on said upper bracket and lying in superposed relation with said latch plate; a turned-down end on said release member adapted to engage said latch plate and move it to its inoperative position when the release member is moved longitudinally from its inoperative position; the slot in the release member adjacent said turned-down end having a transverse portion adapted to engage the stud extending through said slot when said release member is pivoted about said other pin and thereby lock said release member against longitudinal movement until it is moved transversely to release said pin from the transverse portion of said slot; and said spring normally urging said release member to its inoperative position acting on the end of said release member remote from said turned-down end and to one side of the line joining said studs so as to normally tend to move said release member longitudinally and transversely to its full inoperative position.

8. An attaching bracket according to claim 4, characterized by the fact that said latch plate is provided with two longitudinal slots engaging a pair of studs on said upper bracket to slide longitudinally in moving between its two positions, said release member provided with two longitudinal slots engaging said pair of studs on said upper bracket and lying in superposed relation with said latch plate; a turned-down end on said release member adapted to engage said latch plate and move it to its inoperative position when the release member is moved longitudinally from its inoperative position; the slot in the release member adjacent said turned-down end having a transverse portion adapted to engage the stud extending through said slot when said release member is pivoted about said other stud and thereby lock said release member against longitudinal movement until it is moved transversely to release said stud from the transverse portion of said slot, and wherein the spring normally moving said latch plate to its latching position and said spring normally moving said release member to its inoperative position are replaced by a single tension spring having one end fastened to one end of the latch plate and the other end fastened to the end of said release member opposite the turned-down end thereof and to one side of the line joining said studs; the intermediate portion of said spring engaging an arbor spaced from the fixed ends of said spring by a distance sufficient to place both reaches of the spring under tension, said arbor being offset with respect to the point of connection of the end of the spring with said release member to cause this reach of the spring to tend to pivot the release member around the stud adjacent the attached ends of the spring and thereby move said transverse portion of the slot into engagement with its respective stud.

ARTHUR B. FOX.

REFERENCES CITED

The following references are of record in the file of this patent:

UNITED STATES PATENTS

| Number | Name | Date |
|---|---|---|
| 2,096,856 | Nuchterlein | Oct. 26, 1937 |
| 2,102,023 | Overbury | Dec. 14, 1937 |
| 2,297,111 | Paul | Sept. 29, 1942 |
| 2,310,165 | Steiner | Feb. 2, 1943 |